United States Patent [19]

Gumlich

[11] 3,851,545

[45] Dec. 3, 1974

[54] CONTINUOUSLY VARIABLE TRANSMISSION

[76] Inventor: Geert Gumlich, Sommerfieldring No. 19, 1 Berlin 39, Germany

[22] Filed: Aug. 24, 1972

[21] Appl. No.: 283,534

[30] Foreign Application Priority Data
Aug. 31, 1971 Germany............................ 2144213

[52] U.S. Cl. ................................................ 74/751
[51] Int. Cl. ............................................ F16h 3/74
[58] Field of Search............ 74/5 R, 751, 5.34, 537

[56] References Cited
UNITED STATES PATENTS

| | | | |
|---|---|---|---|
| 2,088,834 | 8/1937 | Briggs | 74/751 |
| 2,296,654 | 9/1942 | Stein et al. | 74/751 |
| 2,389,826 | 11/1945 | Stalker | 74/5 |
| 2,960,889 | 11/1960 | Keyser | 74/751 |
| 3,394,619 | 7/1968 | Preston | 74/751 |
| 3,439,561 | 4/1969 | Preston | 74/751 |

FOREIGN PATENTS OR APPLICATIONS

| | | | |
|---|---|---|---|
| 692,079 | 7/1930 | France | 74/751 |

*Primary Examiner*—Manuel A. Antonakas
*Attorney, Agent, or Firm*—Smythe & Moore

[57] ABSTRACT

A continuously variable transmission or drive. The variable reaction torques for transmitting power are transmitted from at least one pair of gyros to a gearwheel interposed between the driving and driven shafts and fixed to a gyro cage containing the gyros. The gyro cage is mounted so as to be rotatable in a rotatable housing. The transmission or drive is characterised in that the said gyros are so arranged that with rotation of the gearwheel about its own axis, under adjusted operating conditions, the two gyros are each constrained to remain parallel to themselves.

3 Claims, 10 Drawing Figures

$$\bar{M}_r = \frac{J}{K}(\bar{\omega}_F \times \bar{\omega}_P)$$

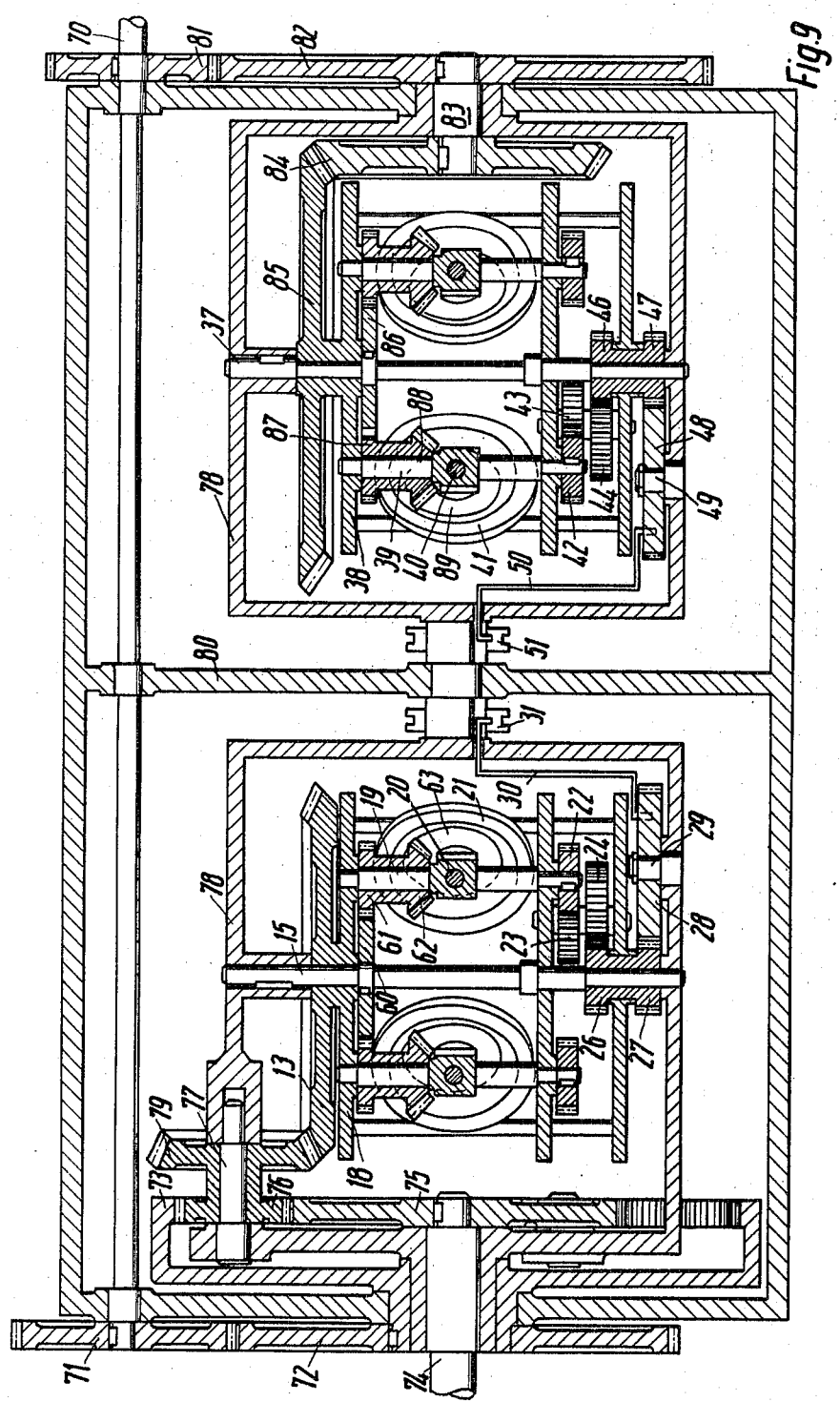

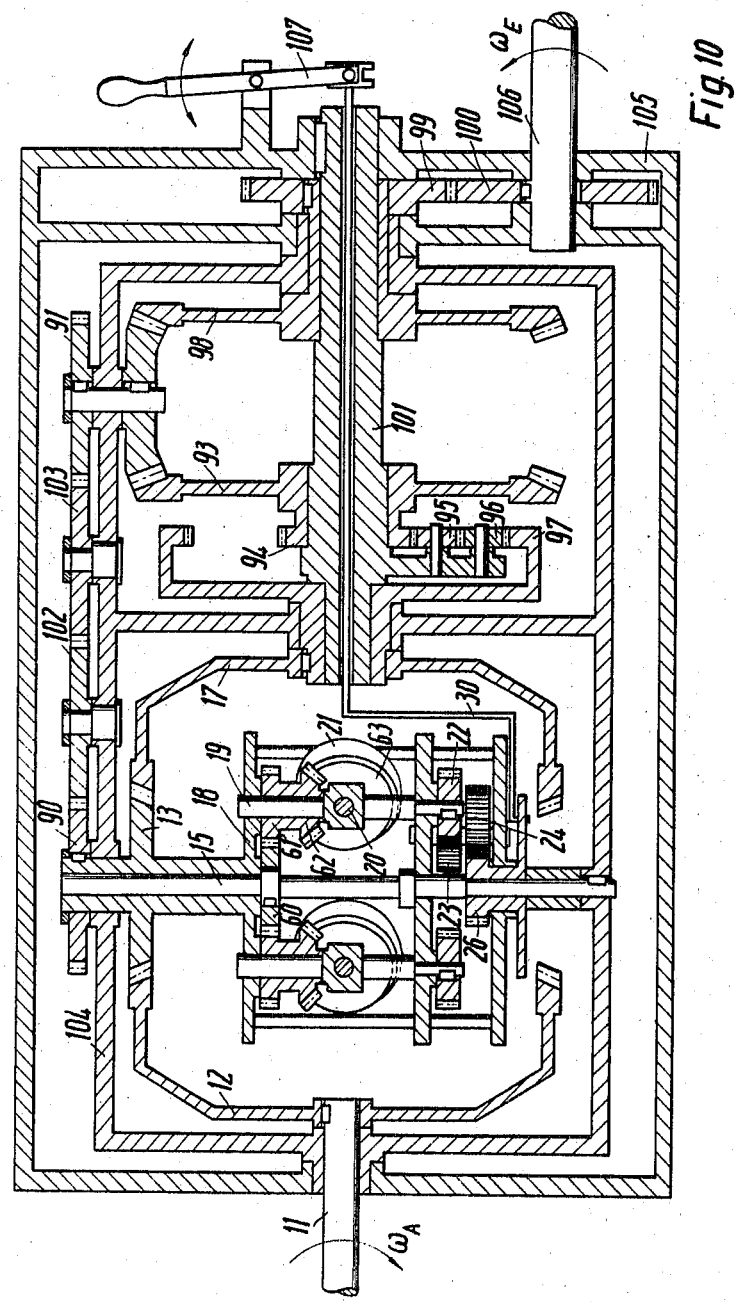

CONTINUOUSLY VARIABLE TRANSMISSION

The invention relates to a continuously variable transmission or drive particularly for motor vehicles in which the variable torques for transmitting power are transmitted from gyros to a gearwheel interposed between the driving and the driven shafts and fixed to a gyro cage containing the gyros, the gyro cage being mounted so as to be rotatable in a rotatable housing.

Transmission of this kind is known in which a driving pinion drives in rotation a gearwheel interposed between the driving and the driven parts and fixed to a housing. Gyros, each consisting of a number of parts, are mounted to rotate in the housing. Each gyro is fixed to a bevel wheel which meshes with a second bevel wheel fixed to a hollow axle. Rotation of the hollow axle makes the gyro spin. The hollow axle is mounted in a frame to which a pinion is attached (U.S. Patent No. 2,877,667). During operation of the drive the distance between each gyro and the centre of mass of the supporting housing is varied continuously. This is necessary in order to ensure that the total torque applied about the axis of rotation of the frame is always in the same direction. The resulting disadvantage is that the cyclic changing of the moments of inertia of the gyros by shifting masses results in costly complications. Moreover a pulsating torque is obtained, because each individual resulting torque depends in the first place on the changing angular position of the gyro spin axis and secondly, on the moment of inertia of the gyro which changes in response to a particular function. This pulsation necessarily prevents the drive from functioning quietly and promotes abrasion.

A differential drive or transmission is also known consisting of two similar units. Each unit has a primary gyro and, housed in this, a secondary gyro (French Patent Specification 617,088). With each rotation of the primary gyro the reaction torque of the secondary gyro changes in direction. Consequently the torques transmitted to the two driven axles vary all the time between maximal and minimal values. This drive therefore also produces pulsating torques.

The object of the present invention is to remove the disadvantages mentioned above of the known drives and to provide a drive of the kind mentioned at the beginning which uses less complex gyros and which allows a constant, that is to say a non-pulsating torque to be obtained after adjustment to the existing operating conditions. The problem is solved according to the invention in that with rotation of the gearwheel about its own axis the gyro spin axles are constrained to remain parallel to themselves, under the adjusted operating conditions.

The transmission according to the invention has the advantage that the torque applied to the driven shaft remains constant during the rotation of the housing. This is because during rotation of the gearwheel and shaft the gyros remain parallel to themselves, the angle between the gyro spin axis and the precession axis remaining unchanged.

Consequently the transmission functions quietly and the driven machinery functions quietly. The transmission is of comparatively simple construction and uses gyros rotating at high spin speeds.

The transmission according to the invention also functions as a clutch, using the existing parts provided for the speed adjustment, no frictional parts subject to abrasion being used. Furthermore the driven shaft can be driven in reverse, still with continuous speed variation.

The invention will now be described in greater detail on the basis of the several examples represented in the drawing, in which.

Figure 8:
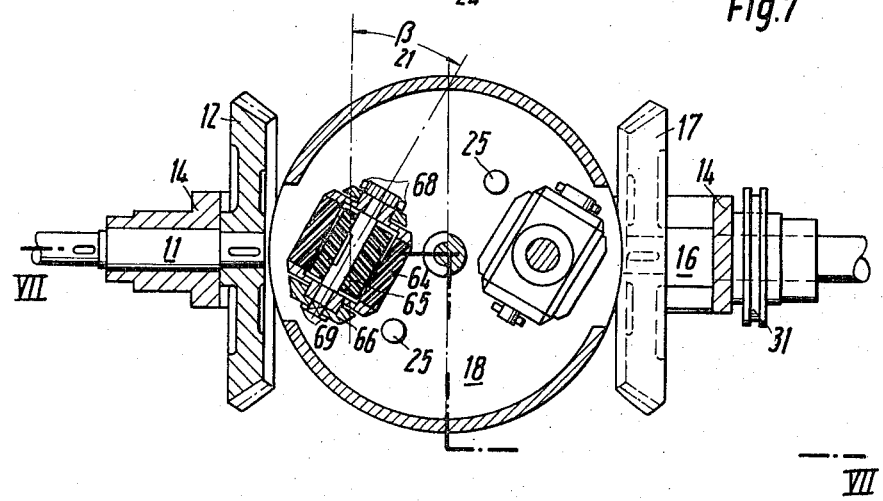

FIG. 8 is a section taken along the line VIII—VIII in FIG. VII. FIG. 9 shows a further example.

FIG. 10 shows an example in which the extra force is derived from further gearwheels.

Figure 1:
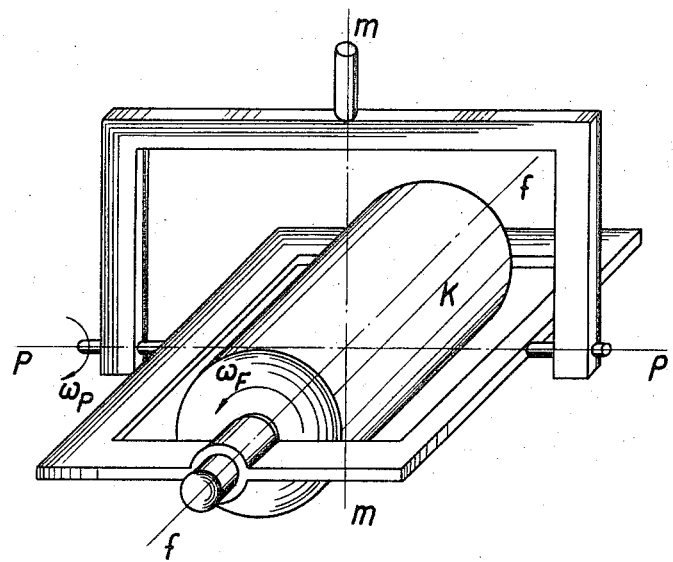
FIG. 1 is a diagram illustrating the gyro effect.
Figure 1:
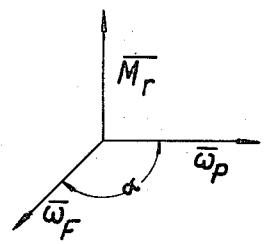

The transmission or drive is based on the known gyro effect obtained when a gyro is rotating about two axes (Compare FIG. 1). This effect can be expressed as follows. Let it be assumed that a massive body (the gyro K) is rotating at an angular velocity $\omega_F$ about its spin axis f—f and also rotating at an angular velocity $\omega_P$ about a second axis p—p, which forms a finite angle $\alpha$ with the spin axis. Under these circumstances a reaction torque $M_r$ is produced about a third axis m—m which is perpendicular both to the spin axis f—f and to the second axis p—p. The value and direction of the resulting reaction torque vector $\overline{M}_r$ can be calculated as the vector product $(\overline{\omega}_F \times \overline{\omega}_p)$ multiplied by the moment of inertia $I_K$ of the gyro. If the angular velocities and the moment of inertia are constants, the resulting reaction torque can be varied by varying the angle $\alpha$ between the spin axis f—f and the second axis p—p.

Figure 2:
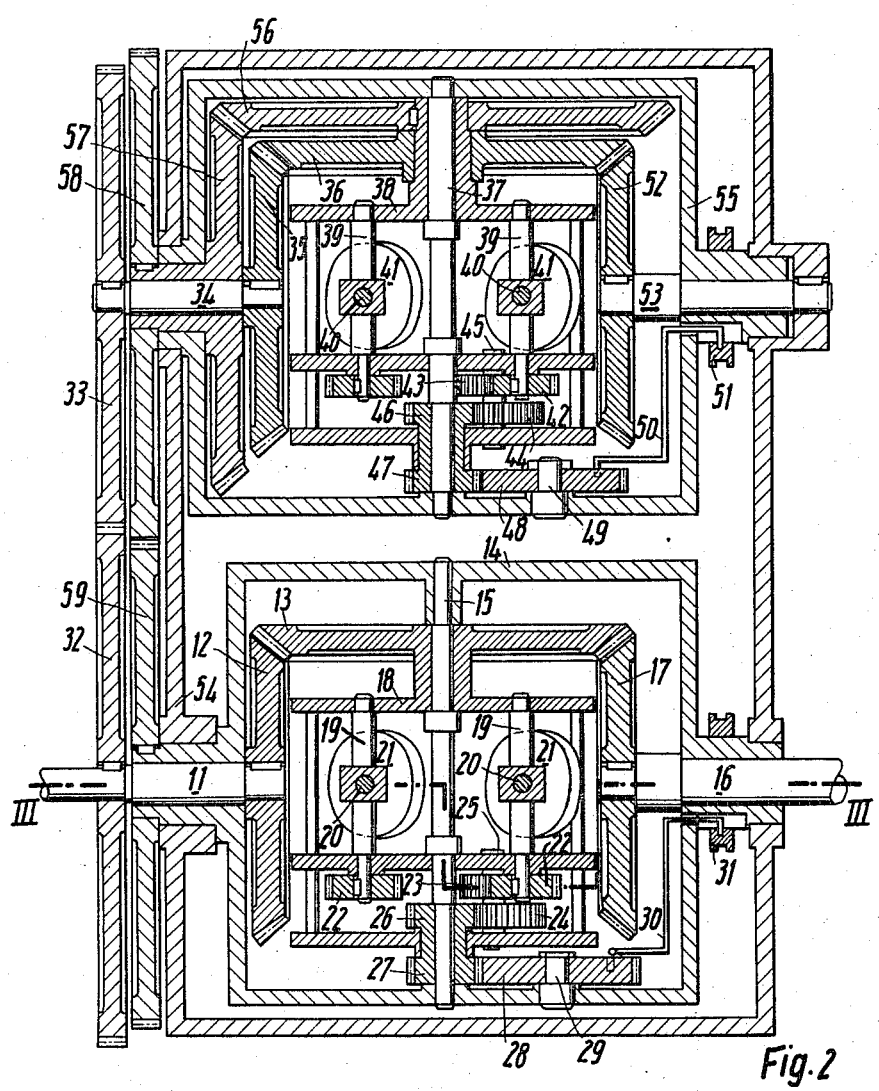
FIG. 2 is a longitudinal section through a first example of the drive.

FIG. 2 is a longitudinal section through the transmission or drive. In this figure and in all the other figures, the bearings are represented diagrammatically as plain bearings, for the sake of clarity, and the figures do not go into details. It is obvious that roller bearings are preferred in practice wherever possible. FIG. 2 shows a driving shaft 11 which is fixed to a bevel wheel 12 which drives a bevel wheel 13 fixed to a shaft 15 which rotates in central bearings in an outer frame 14. The bevel wheel 13 also rotates with the outer frame 14 about the common axis of the driving shaft 11 and the driven shaft 16, to which is fixed a bevel wheel 17 which meshes with the bevel wheel 13. The bevel wheel 13 always rotates with the outer frame 14 about the common axis of the shafts 11 and 16 unless the driven shaft 16 is rotating in the opposite direction as the driving shaft 11 and at the same angular velocity. Fixed to the bevel wheel 13 there is an inner cage 18 containing gyros. Mounted to rotate in bearings in the cage 18 there are gyro support shafts 19 which support the spin axles 20 of gyros 21.

In what follows the term "gyro unit" will be used for the combination consisting of a gyro with its spin axle and a shaft (or frame with stub axles) which forms a finite angle with the spin axle.

Let it be assumed that a gyro 21 is spinning, that is to say rotating, on its spin axle 20 and also rotating together with the gyro cage 18 about the common axis of the shafts 11 and 16. Due to the gyro effect mentioned above a reaction torque acts on the support shaft 19. This reaction torque is transmitted to a gearwheel 22 fixed to the support shaft 19. From the gearwheel 22 the reaction torque is transmitted to a gearwheel 23 to which is fixed a gearwheel 24, the two gearwheels 23 and 24 rotating on a shaft 25 (compare FIG. 3) which is fixed in the gyro cage 18. The gearwheel 24 meshes with a gearwheel 26 which is mounted on the shaft 15 of the bevel wheel 13, the gearwheel 26 being free to rotate on the shaft 15. The gearwheel 26 is normally held stationary relative to the outer frame 14, except at those times when an adjustment is taking place which will be described further below. The diameters of the gearwheels 22, 23, 24, 26 are calculated so as to ensure that during rotation of the gyro cage 18 about the shaft 15 the spin axles 20 of the gyros 21 remain constantly parallel to themselves. For this the radii of the gearwheels must be related to each other as expressed by the equation:-

$$r_{22} = [r_{23} (r_{24} + r_{26})]/r_{24}$$

The same effect could be obtained by using a chain drive with chain sprocket wheels on the shafts 15 and 19. The reaction torque acting on each gyro 21 is therefore transmitted from the support shaft 19 through the gearwheels 22, 23, 24, 26 (or through the chain drive) to gyro cage 18 and bevel wheel 13. The gyro units are arranged in pairs at 180° to each other for compensating the radial forces applied by the gyro cage 18 and the gearwheel 26 to the shaft 15.

To save space, that is to say in order to obtain the greatest possible total moment of inertia $I_{total}$ for all the gyros with the most compact drive possible it can be advisable to use more than one pair of gyro units The angular velocity of rotation of the cage 18 about the common axis of the driving and driven shafts 11 and 16 is determined by the rates of rotation of these two shafts.

Assuming a given angular velocity of the cage about this axis and assuming a given total moment of inertia for all the gyros 21, the reaction torques produced by the gyro units can be made to cancel out, over a wide range of speed ratios $n_{11}/n_{16}$, the torque applied by the bevel wheels 12 and 17 to bevel wheel 13. This is done by suitably adjusting the angular velocities of spin $\omega_{21}$ of the gyros about their spin axes 20 and suitably adjusting the attitude angle $\beta_{21}$ of the gyros. The attitude angle $\beta_{21}$ is varied by rotating the gearwheel 26 relative to the outer frame 14.

A mechanical transmission for effecting this can be arranged as follows.

Fixed to the gearwheel 26 there is a gearwheel 27 which meshes with a gearwheel 28 which rotates on a shaft 29 fixed to the outer frame 14. The gearwheel 28 is rotated, for effecting the adjustment, through a control rod 30 by the sliding movement of a control sleeve 31.

In addition to compensating out, that is to say equalising the torques, it is necessary to compensate the forces acting on the bevel wheel 13 by applying a suitable radial force, that is to say by applying an additional force.

This can either be derived from the drive itself, by means of further gearwheels, or the necessary additional force can be obtained from a second similar drive system.

In the latter case, as shown in FIG. 2, the outer frame 14, which is mounted to rotate in bearings in a drive housing 54, is used with the shaft 15 for producing a force whose nature will now be described. Rotation of the driving shaft 11 drives, through gear wheels 32, 33 and through a shaft 34, a bevel wheel 35 which applies a tangential force to a bevel wheel 36. This tangential force is necessarily balanced by an equal tangential force applied to a bevel wheel 52 which is fixed to the housing 54, with the result that a radial force twice as great is applied to the bevel wheel 36.

Assuming that gyros 41 are spinning on their spin axles 40 and that the outer frame 55 is rotating about the common axis of the shafts 34 and 53 then, in analogy with the effect produced by the gyros 21, a torque is applied to the gyro cage 38. Parallel movement of the gyros 41 relative to the gyro cage 38 is ensured, as already described above, by suitably calculating the relative diameters of the gearwheels 42, 43, 44, 46.

The attitude angle $\beta_{41}$ of the gyros 41 can be adjusted, as already described, by rotating the gearwheel 46, relative to the outer frame 55, by means of gearwheels 47, 48, a control rod 50 and a sliding control sleeve 51.

The torque applied to the gyro cage 38 is transmitted through a bevel wheel 56 as a tangential force to a bevel wheel 57, resulting in an equally great radial force applied to this bevel wheel.

Assuming that the gyros 41 are rotating at suitable angular velocities about both axes and assuming a suitable total moment of inertia $I_{41\ total}$, the resulting radial force acting on the bevel wheel 56 compensates the radial force which is acting, as mentioned above, on the bevel wheel 36. The effect desired is obtained in that the tangential force acting on the bevel wheel 57 is transmitted, through gearwheels 58 and 59, to the outer frame 14, with the result that the desired radial force, or additional force, for balancing the system, is applied to the bevel wheel 13.

The following two equations describe quite generally the functions of the attitude angles. These equations contain the following quantities: the angular velocity $\omega_A = \omega_{11}$ of the driving shaft 11, the torque $Md_A$ applied by the driving shaft 11, the angular velocity $\omega_E = \omega_{16}$ of the driven shaft 16, the total moment of inertia $I_{21\ total}$ or $I_{41\ total}$ of the gyros and the angular velocities of spin $\omega_{21}$ and $\omega_{41}$ of the gyros about their spin axes 20 and 40. It is assumed that power is transmitted without loss ($Md_A\ \omega_A = Md_E\ \omega_E$).

$$I_{21\ total}\ \omega_{21} \cos \beta_{21} = Md_A f_1 \text{ (wheel dia., } \omega_A, \omega_E)$$

$$I_{41\ total}\ \omega_{41} \cos \beta_{41} = Md_A f_2 \text{ (wheel dia., } \omega_A, \omega_E)$$

Power for spinning the gyros on their spin axles 20, 40 can be supplied mechanically, electrically, hydraulically or pneumatically. Once the gyros have been spun up to working speed very little power is required to drive them, only enough to overcome the small amount of friction in the spin bearings.

Figure 3:
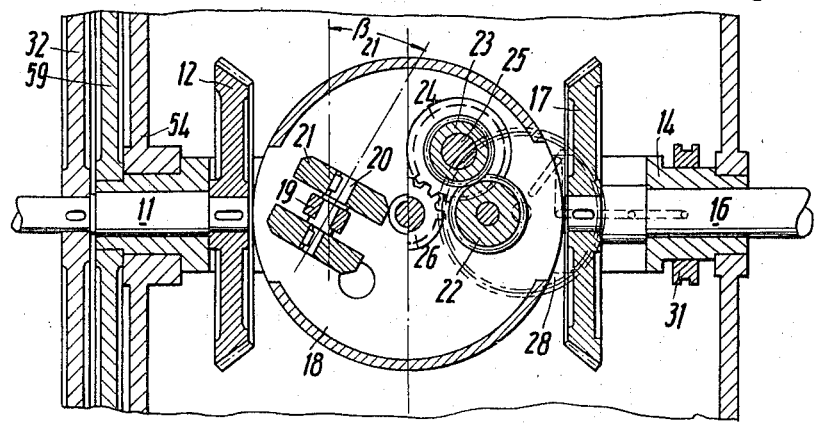
FIG. 3 is a section taken along the line III—III in FIG. 2.
Figure 4:
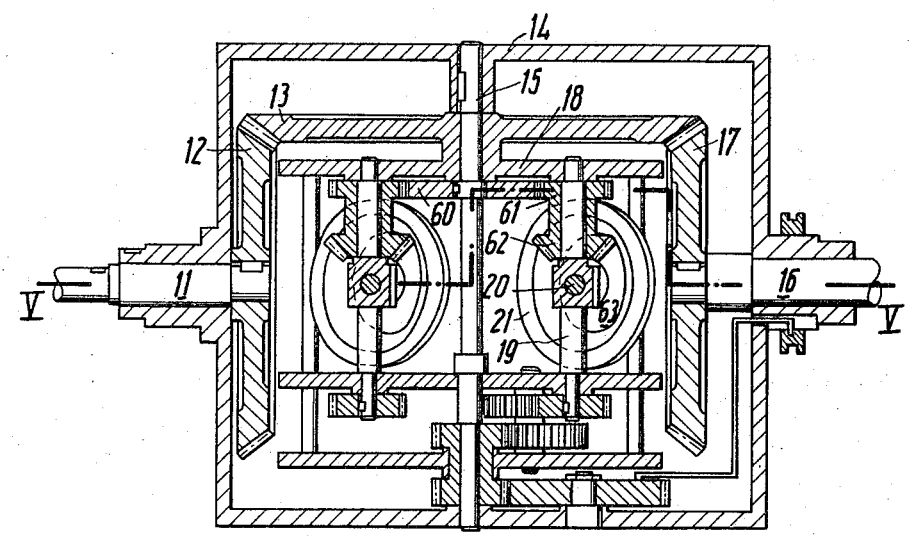
FIG. 4 shows a drive with mechanically driven gyros.
Figure 5:
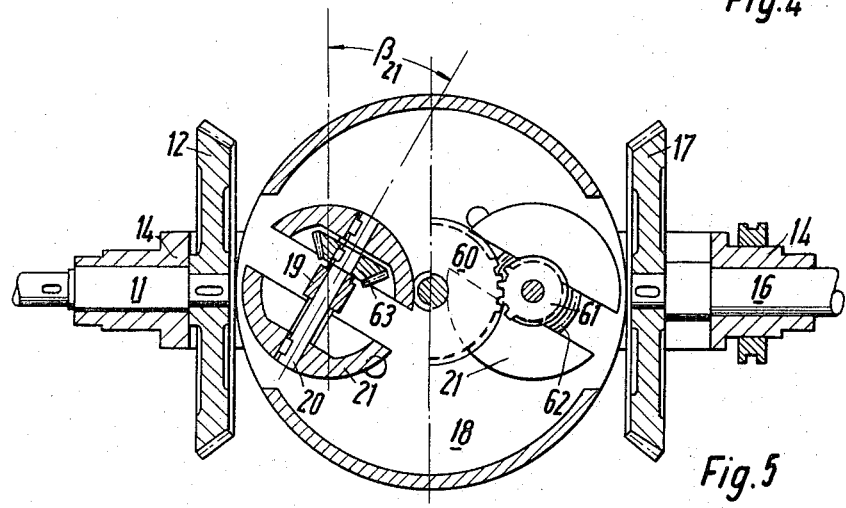
FIG. 5 is a sectional taken along the line V—V in FIG. 4.

FIGS. 4 and 5 show a system in which the gyros 21 are driven mechanically. In this example the gyro rotors are shown as hemispherical shells. A gearwheel 60 is fixed to a shaft 15, which is itself fixed in the outer frame 14. Gearwheels 61 mounted to rotate on the gyro support shafts 19 mesh with the gearwheel 60. Fixed to the gearwheels 61 there are bevel wheels 62 which mesh with bevel wheels 63 fixed to the gyro spin axles 20 to which the gyros are fixed. Consequently with rotation of the gyro cage 18 about the shaft 15 the gearwheels 61, acting through the bevel wheels 62, 63, drive the gyros in rotation so that they spin. This arrangement has the effect that the angular velocities of spin $\omega_{21}$ of the gyros depends on the rates of rotation of the driving and driven shafts 11, 16. If the two gyros systems shown in FIGS. 2 and 3 are driven mechanically using the arrangement shown in FIGS. 4 and 5, the functions for the total moment of inertia $I_{total}$ and for the attitude angle $\beta$ take the form:

$$I_{21\ total} \cos \beta_{21} = Md_A f_3 \text{ (wheel dia., } \omega_A, \omega_E)$$

$$I_{41\ total} \cos \beta_{41} = Md_A f_4 \text{ (wheel dia., } \omega_A, \omega_E)$$

The rates of spin of the gyros 21 can be increased by interposing further gearwheels between the gearwheels 60 and 61, or by driving the shaft 15, with its gearwheel 60, so that it rotates in the opposite direction to the gyro cage 18. This can be done by fixing a bevel wheel to the shaft 15 and driving this my means of a further bevel wheel fixed coaxially to the driving bevel wheel 12.

Figure 6:
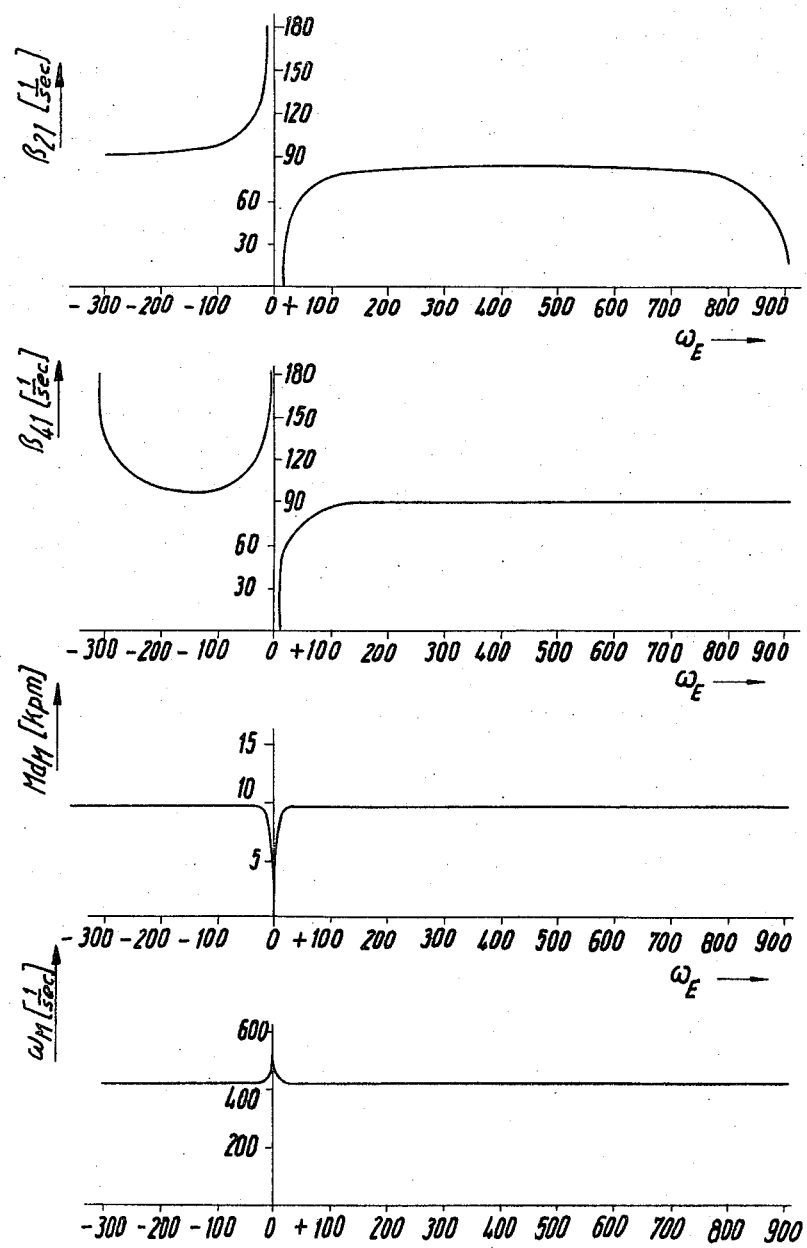
FIG. 6 shows curves for illustrating the method of functioning of the transmission drive according to the invention.

Referring now to FIG. 6, this shows as an example the angular velocity $\omega_E$ of the driven shaft in the drive of FIGS. 2 and 3, using mechanically driven gyros arranged as shown in FIGS. 4 and 5. The curves are calculated from the indicated functions. The small power losses in the bearings and on the flanks of the gearwheel teeth have been neglected. The drive is calculated for an internal combustion engine which delivers a maximal power of 54 PS (metric horse power) at a crankshaft speed of $n_M = 4000$ rev/min. In order to obtain higher angular velocities a gear train is interposed between the engine and the drive, giving a stepped up gear ratio of $1 = 1:2$. Each gyro cage contains eight steel gyros arranged to form pairs of gyro units. Each gyro rotor is a hemispherical shell with an external radius $r_e = 32$ mm, and an internal radius $r_i = 22$ mm. As explained above, the curves for the attitude angles $\beta_{21}$ and $\beta_{41}$ depend on the gearwheel diameters. In the present example it is assumed that the engine is delivering, running at full power, a constant output torque of $Md_M = 9.66$ kp m, the crankshaft speed remaining constant at $\omega_M = 418$ l/sec. It is assumed that the angular velocity $\omega_E$ of the driven shaft is varied continuously between 20 and 900 l/sec during forward drive and between $-20$ and $-300$ l/sec when the vehicle is being driven in reverse. It is assumed that no power is lost, that is to say:

$$Md_A \omega_A = Md_E \omega_E.$$

For the limiting case in which the angular velocity of the driven shaft $\omega_E = 0$, the torque $Md_E$ applied to the driven shaft becomes infinitely large and variation of the drive ratio is meaningless. This is however, merely a theoretical limiting case, if only because the driven machine parts cannot be designed to transmit infinite torque. In practice, in the case for example of a drive intended for driving a motor vehicle, at the start the torque delivered by the engine is less than the highest torque which the engine is capable of delivering. Shortly after the start the engine can pick up to its highest power output at a corresponding engine speed, for accelerating the vehicle. Finally the engine can be assumed to settle down at an engine speed corresponding to the total resistance to travel with the vehicle moving at cruising speed.

Figure 7:
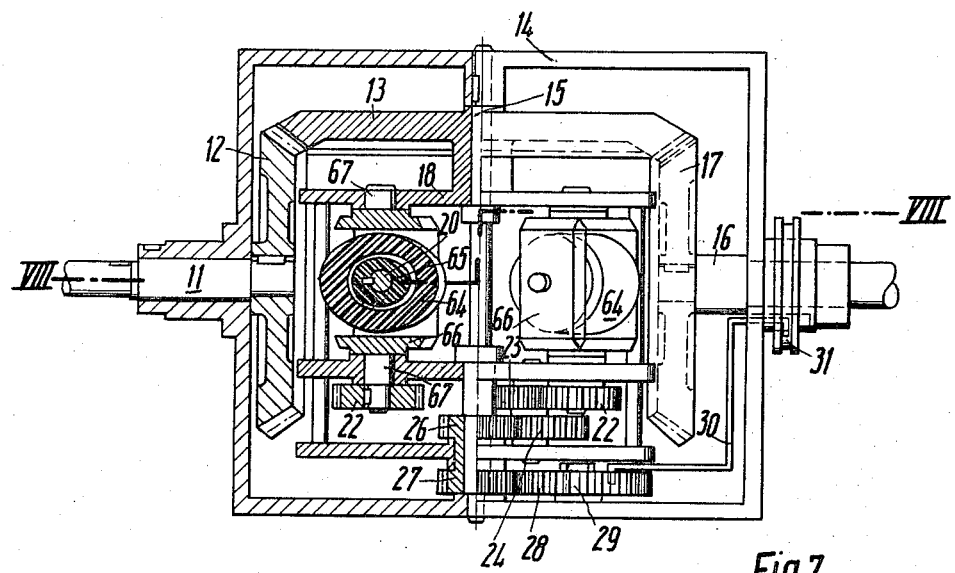
FIG. 7 shows a part of a drive in which the gyros are driven electrically, the figure being a section taken along the line VII—VII in FIG. 8.

FIGS. 7 and 8 illustrate an electric drive system for driving the gyros. To give each gyro the greatest possible moment of inertia (moment of gyration) the outer part can be constructed as the rotor 65 of the electric motor. The inner part 65, fixed to the spin axle 20, is the stator. The spin axle 20 is fixed in a frame 66 fixed to a gyro support shaft 67 which rotates in bearings in a gyro cage 18. Parallel guidance of the frame 66 is ensured by the agreement between the diameters of the gearwheels 22, 23, 24, 26. The attitude angle $\beta_{21}$ is adjusted, as described before, by rotating the gearwheel 26 relative to the outer housing 14. Electric current is supplied to the gyro rotor 64 over brushes and a commutator indicated at 68, the stator 65 receiving current over terminals 69. If desired, the motor can be arranged on the squirrel cage principle. The electric power for driving the gyros is supplied from an external source over terminals, brushes and slip rings, on the gyro cage 18, the outer frame 14 and its axle, these details being omitted for greater clarity in the drawing. Electric drive, as represented in FIGS. 7 and 8, for the gyros has the advantage that electric control devices can be used for controlling both the angular velocity of spin $\omega_{64}$ and the attitude angle $\beta_{21}$. Either one or both of these qualities can be controlled, depending on the particular characteristics of the drive.

On the other hand the gyros can be driven hydraulically or pneumatically. In this case the turbine is preferably incorporated in the gyro rotor, to give the gyro the greatest possible moment of inertia. The turbine blades are preferably housed in the gyro rotor.

The hydraulic fluid is fed through annular grooves and bores passing over and through the spin axles, the gyro cage, the central shaft of the frame and the frame itself. The use of a hydraulic oil has the advantage that oil mist can lubricate the gearwheels and the bearings. The hydraulic oil can be delivered to the gyros under pressure by a pump coupled to the driving shaft.

The torque applied by the gyro units to the gyro cage can if desired be influenced by adjusting the moments of inertia (moments of gyration) of the gyros. For this purpose massive bodies can, for example, be installed in guides so that they can be moved, for adjustment purposes, radially with respect to the spin axles 20, 40 of the gyros. The radial distance of the massive body from the spin axle is adjusted by suitable means for adaptation to the gyroscopic moment of inertia necessary for balancing the forces.

FIG. 9 shows an arrangement in which the gyro cage, whose method of functioning has been described above, is combined with a planetary drive. A driving shaft 70 drives, through gearwheels 71 and 72, the outer gearwheel 73 of the planetary drive. A sun wheel 75 is fixed to the driven shaft 74 of the drive. Assuming that the sun wheel 75 and the outer wheel 73 are rotating at different speeds, the planetary wheel 76 is driven so that it rotates both about its own shaft 77 and about the axis of the sun wheel 75. The shaft 77 of the planetary wheel 76 engages with a double frame 78 mounted to rotate about its longitudinal axis in bearings in a drive housing 80. A bevel wheel 79 fixed to the planetary wheel 76 meshes with a bevel wheel 13 fixed to the gyro cage 18, these two parts rotating on a shaft 15 which is fixed centrally in the double frame 78. In this example, the gyros 21 are driven mechanically in the manner described before. With rotation of the gyro cage 18 about the shaft 15 the gearwheels 61 roll around the stationary gearwheel 60 driving, through bevel wheels 62 and 63, the gyros 21 so that they spin on their spin axles 20. With the gyros 21 spinning and the double frame 78 rotating, for the reason mentioned above, a torque is applied, due to the gyro effect already mentioned, through the gearwheels 22, 23, 24, 26 to the bevel wheel 13, the torque being transmitted through the bevel wheel 79 to the planetary wheel 76. Furthermore a radial force is applied by the shaft 15, through the double frame 78, to the shaft 77 of the planetary wheel. The torque applied to the planetary wheel 76 for converting the torque $Md_A$ suplied by the driving shaft 70 into a torque $Md_E$ applied to the driven shaft 74 is determined by adjusting the attitude angle $\beta_{21}$ in the manner already described above. In order to maintain the balance of forces the radial force acting on the planetary wheel 76 must be adjustable, for all values of the ratio $Md_A/Md_E$, independently of the torque which needs to be applied to the planetary wheel 76. To obtain this a second gyro system is arranged in the double frame 78. The driving shaft 70, acting through the gearwheels 81 and 82 and through the bevel wheels 84 and 85, drives the gyro cage 38 so that it rotates about the shaft 37 which is fixed in the double frame 78. The resulting angular velocity of the gyro cage 38 is determined by the difference between the angular velocity of the double cage 78 and the angular velocity of the bevel wheel 84. The gyros 41 apply, due to the principle already described, a torque to the bevel wheel 85. This torque has two effects. In the first place it compensates the tangential force applied by bevel wheel 84 to bevel wheel 85. Secondly, a corresponding force acts through the central shaft 37 on the double frame 78. This force can be influenced by adjusting the attitude angle $\beta_{41}$, in such a way that the total radial force applied by the double frame 78 and the shaft 77 to the planetary wheel 76 satisfies the equilibrium requirements for the existing ratio $Md_A/Md_E$. The two attitude angles $\beta_{21}$ and $\beta_{24}$ are calculated, for given total moments of inertia $I_{21\ total}$ and $I_{41\ total}$ of the gyros, from the equations:

$$\cos \beta_{21} = (Md_A/I_{21\ total}) f_5 \text{ (wheel dia., } \omega_A, \omega_E)$$

$$\cos \beta_{41} = (Md_A/I_{41\ total}) f_6 \text{ (wheel dia., } \omega_A, \omega_E)$$

In FIG. 10 a drive is shown in which only one gyro cage 18 is necessary, with gyros 21. In this drive the power flows from the driving shaft 11 through bevel wheels 12, 13, 17, through the internally toothed wheel 97 and through gearwheels 96 and 95 mounted to rotate on pins fixed to a stationary shaft 101, and through a gearwheel 94, bevel wheels 93, 92, 98 and gearwheels 99, 100 to the driven shaft 106. The torque produced by the gyros 21 acts, on the one hand, on the bevel wheel 13, thus providing the necessary torque equilibrium. The torque produced by the gyros also acts through gearwheels 90, 102, 103, 91 on the bevel wheel 92, this torque also serving for maintaining the torque equilibrium. The resulting radial forces acting on the bevel wheels 13 and 92 are transmitted to the rotatable outer frame 104. These radial forces act in opposite directions and cancel each other out in the frame 104. In order to satisfy the equilibrium conditions mentioned above for the torques and radial forces, the gyro reaction torques are adjusted by adjusting the attitude angle $\beta_{21}$, by means of the control device 30, 107, in adaptation to the existing operating conditions. The relevant equation takes the form:

$$\cos \beta_{21} = (Md_A/I_{21\ total}) f_7 \text{ (wheel diameter, } \omega_A, \omega_E)$$

The drives described above extend the field of applications of continuously variable mechanical drives in particular to the transmission of comparatively high powers. For this purpose the hitherto known drives have either involved excessive power losses or maintenance costs have been too high. The parts of the drive are not limited in function. If the attitude angle is $\beta=90°$, no torque is applied to the gyro cage and no torque is transmitted from the driving shaft to the driven shaft. Consequently a clutch is unnecessary. The drive itself functions as a clutch, saving cost and eliminating clutch maintenance. On the other hand an attitude angle $\beta$ greater than 90° reverses the direction of the torque applied to the gyro cage and consequently the direction of the torque applied to the driven shaft. The drive according to the invention therefore provides both forward and reverse drive without the use of extra intermediate gearwheels. When driving in reverse the drive is also continuously variable.

For adjusting the attitude angle $\beta$ to suit the existing driving shaft torque $Md_A$ and the desired driving and driven shaft speeds $\omega_A$ and $\omega_E$, hydraulic devices can if desired be used, or lever or cam control devices. For given operating conditions the positions of the control devices can be calculated from the appropriate engine data (for example electric data, gas pressures or the like), from signals delivered by torque meters and shaft speed meters (for example from centrifugal control devices). A drive which is automatically controlled in this way can provide continuous torque conversion over a wide range of shaft speeds.

I claim:

1. A continuously variable transmission including a main housing, a rotatable frame in said housing carried by coaxial driving and driven shafts extending into said housing, gyro cage shaft means extending substantially perpendicular to the axis of said coaxial driving and driven shafts, gyro cage means rotatably mounted on said gyro cage shaft means, bevel gears mounted on said driving and driven shafts and a bevel gear therebetween and meshing therewith mounted on said gyro cage shaft means, a pair of gyro support shafts mounted on said gyro cage means, gyros having spin axles mounted on each of said gyro support shafts, said spin axles being substantially perpendicular to said gyro support shafts, and means connecting said gyro support shafts together and relative to said gyro cage shaft means to maintain said spin axles in parallel relation.

2. A transmission as claimed in claim 1 and wherein the means connecting the gyro support shafts together and relative to said gyro cage shaft means has adjusting means therein for adjusting the angle between said gyro spin axles and the axis of rotation of said rotatable frame.

3. A transmission as claimed in claim 1 and including a further drive mechanism connected thereto, said further drive mechanism including a rotatable frame in said housing carried by coaxial shafts extending into said housing, gyro cage shaft means extending substantially perpendicular to the axis of said coaxial shafts, gyro cage means rotatably mounted on said gyro cage shaft means, bevel gears mounted on said coaxial shafts and a bevel gear therebetween and meshing therewith mounted on said gyro cage shaft means, a pair of gyro support shafts mounted on said gyro cage means, gyros having spin axles mounted on said of said gyro support shafts, said spin axles being substantially perpendicular to said gyro support shafts, and means connecting said gyro support shafts together and relative to said gyro cage shaft means to maintain said spin axles in parallel relation.

* * * * *